United States Patent
Jung

(10) Patent No.: US 9,769,468 B2
(45) Date of Patent: Sep. 19, 2017

(54) IMAGE DISPLAY DEVICE AND METHOD FOR CONTROLLING SAME

(71) Applicant: LG ELECTRONICS INC., Seoul (KR)

(72) Inventor: Kiyoun Jung, Seoul (KR)

(73) Assignee: LG Electronics Inc., Seoul (KR)

(*) Notice: Subject to any disclaimer, the term of this patent is extended or adjusted under 35 U.S.C. 154(b) by 178 days.

(21) Appl. No.: 14/380,866

(22) PCT Filed: Jan. 29, 2013

(86) PCT No.: PCT/KR2013/000701
§ 371 (c)(1),
(2) Date: Aug. 25, 2014

(87) PCT Pub. No.: WO2013/129780
PCT Pub. Date: Sep. 6, 2013

(65) Prior Publication Data
US 2015/0002643 A1    Jan. 1, 2015

(30) Foreign Application Priority Data

Feb. 27, 2012    (KR) .................. 10-2012-0019859

(51) Int. Cl.
*H04N 13/04* (2006.01)
*G02B 27/22* (2006.01)
(Continued)

(52) U.S. Cl.
CPC ..... *H04N 13/0497* (2013.01); *G02B 27/2285* (2013.01); *H04N 13/0445* (2013.01);
(Continued)

(58) Field of Classification Search
None
See application file for complete search history.

(56) References Cited

U.S. PATENT DOCUMENTS 5,793,918 A    8/1998  Hogan
2004/0252374 A1*  12/2004  Saishu ............... G02B 27/2214
                                                        359/462
(Continued)

FOREIGN PATENT DOCUMENTS

KR    10-2008-0088305 A    10/2008
KR    10-2011-0006787 A    1/2011
(Continued)

OTHER PUBLICATIONS

Gael, "Depth Maps Estimation and Use for 3DTV," Rapport Technique N °0379, Feb. 2010, XP55206328A, 72 pgs.*
(Continued)

*Primary Examiner* — James M Anderson, II
(74) *Attorney, Agent, or Firm* — Birch, Stewart, Kolasch & Birch, LLP

(57) ABSTRACT

The present invention relates to a method for controlling an image display device including a flexible display unit, comprising the steps of: obtaining a multi-view image signal including camera position information; obtaining information on the shape of the flexible display unit on the basis of the obtained multi-view image signal; and modifying the shape of the flexible display unit on the basis of the obtained shape information.

7 Claims, 9 Drawing Sheets

(51) Int. Cl.
*H04M 1/02* (2006.01)
*H04N 13/00* (2006.01)

(52) U.S. Cl.
CPC ...... *H04N 13/0447* (2013.01); *H04M 1/0268* (2013.01); *H04N 13/0011* (2013.01); *H04N 2213/001* (2013.01)

(56) References Cited

U.S. PATENT DOCUMENTS

| | | | |
|---|---|---|---|
| 2005/0230641 A1 | 10/2005 | Chun et al. | |
| 2007/0035707 A1* | 2/2007 | Margulis | G03B 21/26 353/122 |
| 2007/0139612 A1* | 6/2007 | Butler-Smith | H04N 13/0003 351/201 |
| 2008/0240549 A1 | 10/2008 | Koo et al. | |
| 2009/0219282 A1* | 9/2009 | Kim | H04N 19/50 345/419 |
| 2010/0002006 A1 | 1/2010 | Mauchly et al. | |
| 2011/0032330 A1* | 2/2011 | Kim | H04N 13/0029 348/43 |
| 2011/0188189 A1* | 8/2011 | Park | G05B 11/01 361/679.05 |
| 2012/0139834 A1* | 6/2012 | Han | G06F 3/03 345/157 |

FOREIGN PATENT DOCUMENTS

| | | |
|---|---|---|
| KR | 10-2011-0088870 A | 8/2011 |
| KR | 10-2011-0110543 A | 10/2011 |

OTHER PUBLICATIONS

Gaël, "Depth Maps Estimation and Use for 3DTV," Rapport Technique N°0379, Feb. 2010, XP55206328A, 72 pgs.

Iwata et al., "Project FEELEX: Adding Haptic Surface to Graphics," Proceedings of the 28th Annual Conference on Computer Graphics and Interactive Techniques, SIGGRAPH '01, Jan. 1, 2001, XP55205944A, 7 pgs.

Leithinger et al., "Direct and Gestural Interaction with Relief: A 2.5D Shape Display," Proceedings of the 24th Annual ACM Symposium on User Interface Software and Technology, UIST'11, Oct. 16-19, 2011, XP58006154A, pp. 541-548.

Leithinger et al., "Relief: A Scalable Actuated Shape Display," Proceedings of the Fourth International Conference on Tangible, Embedded, and Embodied Interaction, TEI 2010, Jan. 1, 2010, XP55206194A, 2 pgs.

Machine translation of KR-10-2011-0006787-A, dated Jan. 21, 2011.

Sajadi et al., "Scalable Multi-view Registration for Multi-Projector Displays on Vertically Extruded Surfaces," Eurographics/ IEEE-VGTC Symposium on Visualization 2010, vol. 29, No. 3, 2010, XP55206483A, 10 pgs.

* cited by examiner (a)

(b)

(c)

(a)

(b)

(a)

(b)

(a)

(b)

(c)

(d)

IMAGE DISPLAY DEVICE AND METHOD FOR CONTROLLING SAME

TECHNICAL FIELD

The present disclosure relates to an image display device having a flexible display module and a control method thereof.

BACKGROUND ART

In recent time, with the rising interest in stereoscopic imaging services, apparatuses for providing such stereoscopic images are under development. Methods of displaying such stereoscopic images include a stereoscopic scheme, a volumetric scheme, a holographic scheme and the like.

A basic principle of the stereoscopic scheme is to generate a stereoscopic image by separately providing images, which are arranged orthogonal to each other, to user's right and left eyes, and combining the images provided to the respective right and left eyes in a brain. Here, that the images are orthogonally arranged denotes that the images do not interfere with each other.

FIG. 1

FIG. 1 is an exemplary view of a stereoscopic image display device.

A method of implementing a stereoscopic image display device can be classified into a glasses type and a non-glasses type.

The glasses-type includes a polarization type, a time-sequential type, and a spectral type.

First, the polarization type is to separate each image using a polarizing filter. That is, polarizing filters which are orthogonal to each other are applied to an image using a left eye and an image using a right eye, such that different images which are filtered by the polarizing filters can be input to visual fields of the left eye and the right eye.

Next, the time-sequential type is a method of separating each image by displaying a left-eye image and a right-eye image in an alternating manner and synchronizing the alternately displayed images with active glasses worn by a user. That is, when the images are displayed in the alternating manner, a shutter of the active glasses which is synchronized with the corresponding image opens only a visual field to which the corresponding image should be input and blocks the other visual field, thereby inputting the left-eye and right-eye images in the separating manner.

Finally, the spectral type is a method of projecting left-eye and right-eye images through spectrum filters, which have spectrum bands in which RGB spectra do not overlap each other. With regard to the left-eye and right-eye images projected in such a manner, a user wears passive glasses having spectral filters through which only spectral bands set for the left-eye and right-eye images are transmitted, thus to receive the left-eye and right-eye images input in a separating manner.

Meanwhile, the non-glasses type includes a multi-view non-glasses type. The multi-view non-glasses type includes a parallax barrier type and a lenticular lens type.

The parallax barrier type is implemented by coating a barrier (layer) on a display. The barrier (layer) includes perpendicular lines with interposing slits therebetween. The slits generate parallax between a left eye and a right eye.

The lenticular lens type is a method of inputting different images to a left eye and a right eye by arranging refined small lenses on a display and refracting an image using the small lenses.

With the spread of 3D contents and contents having a stereoscopic effect, such 3D or stereoscopic image display devices are widely used. Meanwhile, for utilizing the 3D contents, a multi-view display is used for displaying a stereoscopic image.

FIG. 2

FIG. 2 is a reference view illustrating a multi-view display employed in an image display device.

FIG. 2(a) illustrates a general display. As illustrated in of FIG. 2(a), the general display can show the same screen even if viewing angles (views, view angles or fields of view) of users A, B and C change.

FIG. 2(b) illustrates a multi-view display which is capable of displaying different screens in three displaying directions. As illustrated in FIG. 2(b), the users A, B and C can view different screens from one another according to the changes in viewing angles. This results from a filter which is attached on the multi-view display to restrict (limit) a viewing angle for each pixel.

The multi-view display has an advantage in view of displaying a different screen according to a user's viewing angle.

However, there is a limit that a user can feel a stereoscopic effect, (three-dimensional effect or the sense of dimension). Also, there is a disadvantage in that users who are located within a partial viewing angle area cannot deeply feel the stereoscopic effect. Also, the users cannot feel the stereoscopic effect on a partial region of the display.

DISCLOSURE OF THE INVENTION

Therefore, this specification is to provide methods for solving those drawbacks.

In detail, an aspect of the detailed description is to provide a method for allowing a user to fully feel a stereoscopic effect (or a three-dimensional effect) of a stereoscopic image.

Another aspect of the detailed description is to provide a method for allowing users who are located within every viewing angle range can fully feel a stereoscopic effect.

Another aspect of the detailed description is to provide a method for allowing a user to fully feel a stereoscopic effect in every direction that the user views a screen.

The present disclosure can solve the aforementioned drawbacks by providing an image display device and a control method thereof herebelow.

A method for controlling an image display device having a flexible display module in accordance with one aspect of the present disclosure may include acquiring a multi-view image signal including camera position information, acquiring shape information related to the flexible display module based on the acquired multi-view image signal, and changing a shape of the flexible display module based on the acquired shape information.

In accordance with another aspect of the present disclosure, the multi-view image signal may include stereoscopic image data.

In accordance with another aspect of the present disclosure, the shape information acquiring step may include interpolating information between the camera positions.

In accordance with another aspect of the present disclosure, the shape information acquiring step may include acquiring curvature information related to the flexible display module.

In accordance with another aspect of the present disclosure, the shape information acquiring step may include selecting at least one of preset shape information.

In accordance with another aspect of the present disclosure, the shape changing step may include changing the shape of the flexible display module into a shape corresponding to the acquired camera position information.

In accordance with another aspect of the present disclosure, the shape changing step may include applying heat to a shape-forming unit based on the shape information.

In accordance with another aspect of the present disclosure, the shape changing step may include operating the shape-forming unit based on the shape information.

A method for controlling an image display device having a flexible display module in accordance with one aspect of the present disclosure may include acquiring a multi-view image signal including camera position information, acquiring shape information related to the flexible display module based on the acquired multi-view image signal, and outputting a shape change guide to the flexible display module based on the acquired shape information.

In accordance with another aspect of the present disclosure, the shape change guide may include a shape change position and a shape change angle of the flexible display module.

An image display device in accordance with one aspect of the present disclosure may include a flexible display module, an image-acquiring unit that is configured to acquire a multi-view image signal including camera position information, a controller that is configured to acquire shape information related to the flexible display module based on the acquired multi-view image signal, and a shape-forming unit that is configured to change a shape of the flexible display module based on the acquired shape information.

An image display device in accordance with one aspect of the present disclosure may include a flexible display module, an image-acquiring unit that is configured to acquire a multi-view image signal including camera position information, and a controller that is configured to acquire shape information related to the flexible display module based on the acquired multi-view image signal, wherein the flexible display module may output a shape change guide based on the shape information.

Advantageous Effect

In accordance with the detailed description, the related art drawbacks can be overcome.

In detail, according to this specification, a method for allowing a user to fully feel a stereoscopic effect from a stereoscopic image can be provided.

Also, according to this specification, a method for allowing users who are located within every viewing angle range can fully feel a stereoscopic effect can be provided.

In addition, according to this specification, a method for allowing a user to fully feel a stereoscopic effect in every direction that the user views a screen can be provided.

MODES FOR CARRYING OUT THE PREFERRED EMBODIMENTS

Figure 1:
FIG. 1 is an exemplary view illustrating a stereoscopic image display device.
Figure 2:
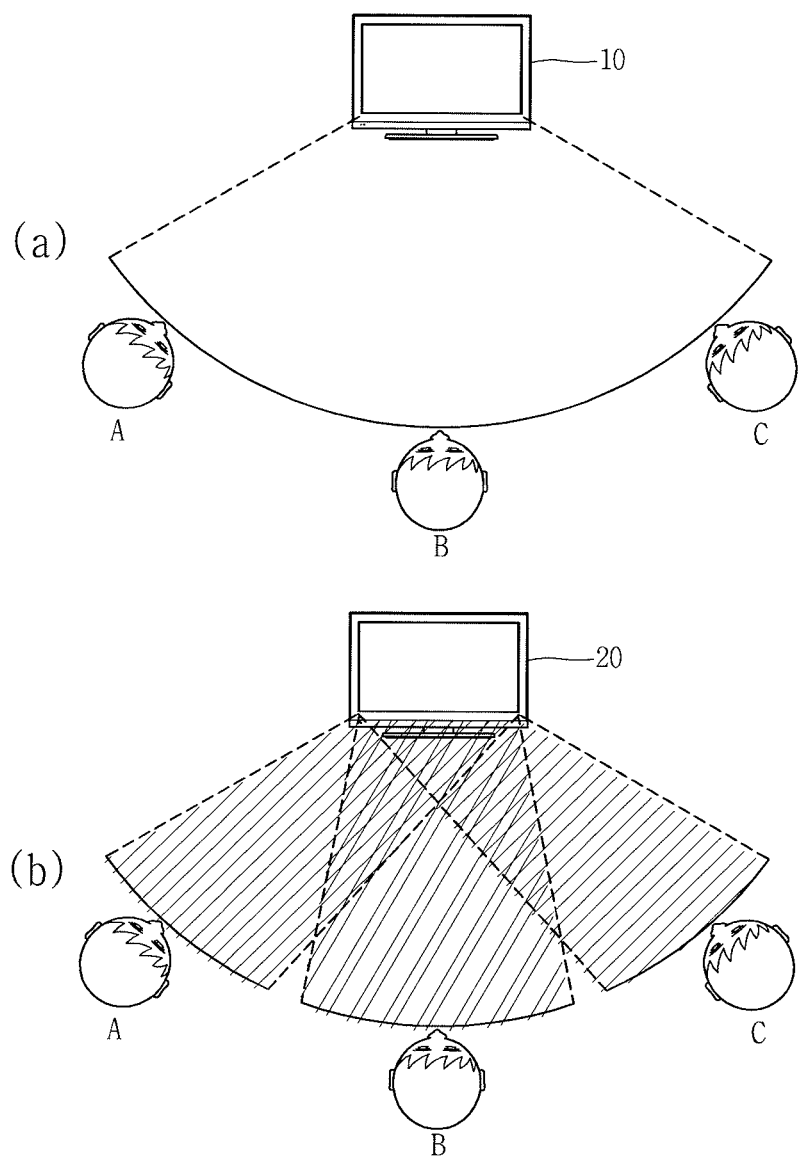
FIG. 2 is a reference view illustrating a multi-view display employed in an image display device.

It should be noted that technological terms used herein are merely used to describe a specific embodiment, but not to limit the present invention. Also, unless particularly defined otherwise, technological terms used herein should be construed as a meaning that is generally understood by those having ordinary skill in the art to which the invention pertains, and should not be construed too broadly or too narrowly. Furthermore, if technological terms used herein are wrong terms unable to correctly express the spirit of the invention, then they should be replaced by technological terms that are properly understood by those skilled in the art. In addition, general terms used in this invention should be construed based on the definition of dictionary, or the context, and should not be construed too broadly or too narrowly.

Incidentally, unless clearly used otherwise, expressions in the singular number include a plural meaning. In this application, the terms "comprising" and "including" should not be construed to necessarily include all of the elements or steps disclosed herein, and should be construed not to include some of the elements or steps thereof, or should be construed to further include additional elements or steps.

In addition, a suffix "module" or "unit" used for constituent elements disclosed in the following description is merely intended for easy description of the specification, and the suffix itself does not give any special meaning or function.

Furthermore, the terms including an ordinal number such as first, second, etc. can be used to describe various elements, but the elements should not be limited by those terms. The terms are used merely for the purpose to distinguish an element from the other element. For example, a first element may be named to a second element, and similarly, a second element may be named to a first element without departing from the scope of right of the invention.

Hereinafter, preferred embodiments of the present invention will be described in detail with reference to the accompanying drawings, and the same or similar elements are designated with the same numeral references regardless of the numerals in the drawings and their redundant description will be omitted.

In describing the present invention, moreover, the detailed description will be omitted when a specific description for publicly known technologies to which the invention pertains is judged to obscure the gist of the present invention. Also, it should be noted that the accompanying drawings are merely illustrated to easily explain the spirit of the invention, and therefore, they should not be construed to limit the spirit of the invention by the accompanying drawings.

FIG. 3

Figure 3:
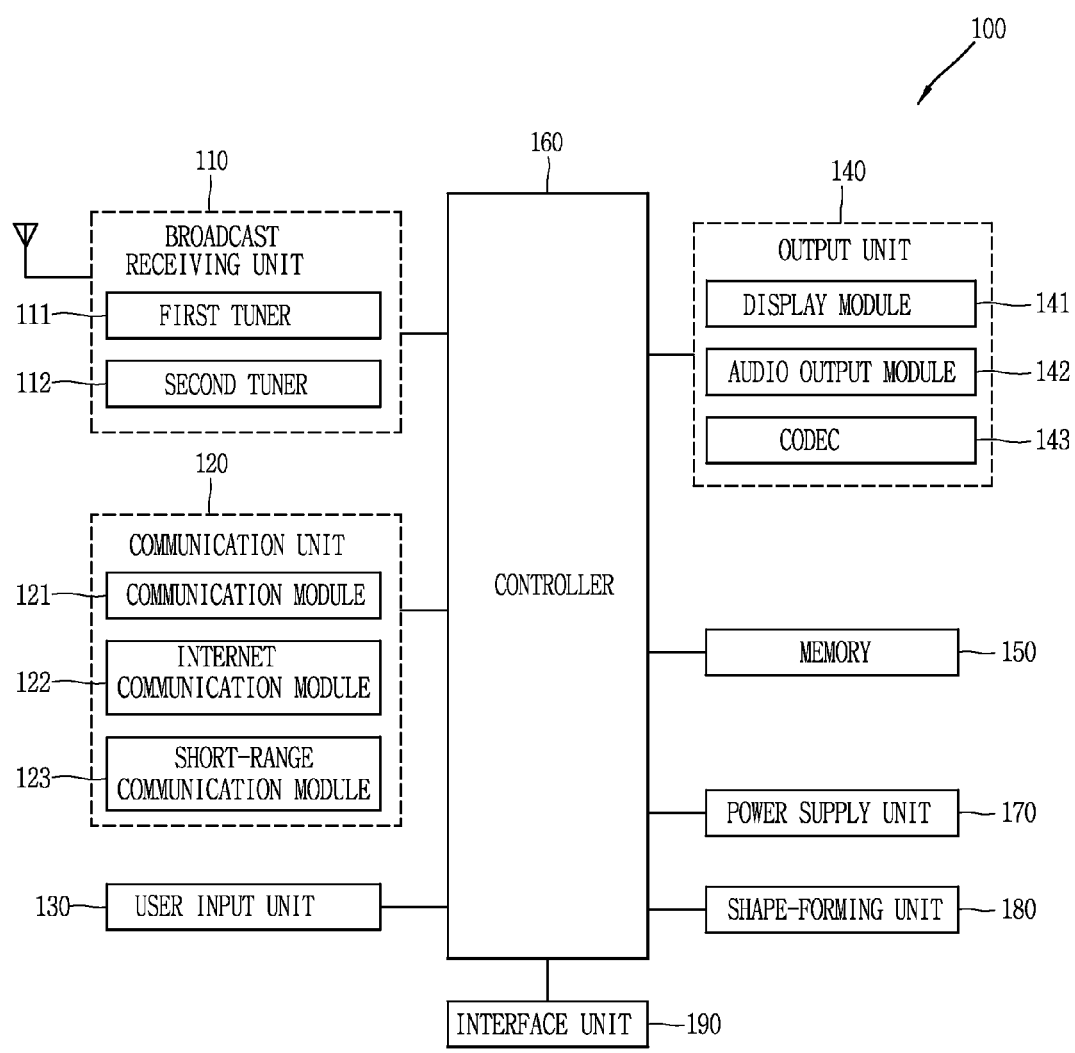
FIG. 3 is a block diagram illustrating a configuration of an image display device in accordance with one exemplary embodiment disclosed herein.

FIG. 3 is a block diagram illustrating a configuration of an image display device in accordance with one exemplary embodiment disclosed herein.

The image display device 100 may include a broadcast receiving unit 110, a communication unit 120, a user input unit 130, an output unit 140, a memory 150, a controller 160, a power supply unit 170, a shape-forming unit 180, an interface unit 190 and the like. FIG. 3 illustrates the mobile terminal having various components, but it may be understood that implementing all of the illustrated components is not a requirement. Greater or fewer components may alternatively be implemented.

Hereinafter, each component will be described in sequence.

The broadcast receiving unit 110 may receive a broadcast signal and/or broadcast associated information from the exterior via a broadcast channel. The broadcast receiving unit may include one or more tuners 111 and 112.

The broadcast channel may include a satellite channel, a terrestrial channel and a cable channel.

The broadcast signal may be implemented as a TV broadcast signal, a radio broadcast signal, and a data broadcast signal, among others. The broadcast signal may further include a data broadcast signal combined with a TV or radio broadcast signal.

Examples of the broadcast associated information may include information associated with a broadcast channel, a broadcast program, a broadcast service provider, or the like. The broadcast associated information may also be provided via a communication network, and, in this case, received by the communication unit 120.

The broadcast associated information may be implemented in various formats. For instance, the broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving unit 110, for example, may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T) and the like. The broadcast receiving unit 110 may also be configured to be suitable for every other broadcast system as well as the digital broadcasting systems.

Broadcast signals and/or broadcast associated information received via the broadcast receiving unit 110 may be stored in a suitable device, such as the memory 150.

The tuners 111 and 112 included in the broadcast receiving unit 110 may receive a broadcast signal of a specific frequency and convert the signal into an intermediate frequency (IF) band signal.

The communication unit 120 may include at least one module which permits wireless/wired communications between an electronic device 100 and a wireless/wired communication system or between the electronic device 100 and a network within which the electronic device 100 is located. For example, the communication unit 120 may include a communication module 121, an internet module 122, a short-range communication module 123, and the like.

The communication module 121 transmits/receives wireless/wired signals to/from at least one of network entities, for example, a base station, an external device, a server, and the like, on a communication network. Here, the wireless/wired signals may include an audio call signal, a video (telephony) call signal, or various formats of data according to transmission/reception of text/multimedia messages.

The Internet communication module 122 denotes a module which is connected with a network using an Internet protocol to transmit/receive data. The image display device 100 may be connected with a network in a wired or wireless manner. Examples of such wireless Internet technologies may include Wireless LAN (WLAN) (Wi-Fi), Wireless Broadband (Wibro), Worldwide Interoperability for Microwave Access (Wimax), High Speed Downlink Packet Access (HSDPA), WiFi and the like.

Examples of such wired Internet technologies may include very high rate digital subscriber lines (VDSL), asymmetric digital subscriber line (ADSL), high bit-rate DSL (HDSL), ISDN digital subscriber line (IDSL), consumer digital subscriber line (CDSL), G.Lite, rate-adaptive digital subscriber line (RADSL), symmetric digital subscriber line (SDSL), unidirectional DSL (UDSL), fiber-to-the-home (FTTH), fiber-to-the-curb (FTTC), hybrid fiber coax, Ethernet, and the like.

The short-range communication module 123 denotes a module for short-range communications. Suitable technologies for implementing this module may include BLUETOOTH, Radio Frequency IDentification (RFID), Infrared Data Association (IrDA), Ultra-WideBand (UWB), ZigBee, and the like.

The user input unit 130 receives signals for controlling operations of the image display device 100. For instance, the operation control signal may denote a control operation (including rewind, fast-forward, pause, record, etc.) of a video which is currently played back. The operation control signal may denote operations of the electronic device (including power on/off, reserved recording, Internet communication module Enable/Disable, short-range wireless communication module Enable/Disable, broadcast channel changing, volume adjustment, mute function, etc.). The operation control signal may also denote a control operation associated with an image mode conversion of a screen and a control operation associated with a stereoscopic effect adjustment of a screen.

The user input unit 130 may also be allowed to receive audio data or video data, which is directly input by a user through a camera or a microphone, as well as the control signal for controlling the image display device 100.

Those signals may be input directly by the user or indirectly by using a wired/wireless remote controller.

Meanwhile, the image display device 100 may receive image data using the broadcast receiving unit 110, the communication unit 120, the user input unit 130 and the like. The image data may include stereoscopic image data, multi-view image data, multi-view stereoscopic image data and the like. Therefore, the broadcast receiving unit 110, the communication unit 120 and the user input unit 130 are defined as an image-acquiring unit.

The output unit 140 is configured to output an audio signal, a video signal, and the like. The output unit 140 may include a display module 141, an audio output module 142, a codec 143, and the like.

The codec 143 denotes a software or device which converts audio or video data into a data format processible by the controller 110 and reproduces the converted data in its original format on the output unit 140 such that the user can recognized it.

The codec may encode/decode various types of data. For example, the codec may encode/decode data in formats of Audio Video Interleaved (AVI), Motion Picture Expert Group (MPEG), DivX, XviD, Windows Media Video codec (WMV), Advanced Video Coding (AVC, H.264), High Efficiency Video Coding (HEVC, H.265), Real Video (RV), Multi View Coding (MVC), Free Viewpoint Coding (FVC) and the like.

Specifically, the codec may decode each standard-based stream including viewpoint (or view) information, and each standard-based stream allowed to obtain viewpoint information from independent multi-stream. The codec may also acquire inter-viewpoint information of stream in the decoding manner. Also, the codec may transcode or encode data into each of the standard-based streams, such as MVC, FVC, AVC, HEVC and the like, based on the acquired inter-viewpoint information.

The audio output module 142 may convert data decoded by the codec 143 into audio data and output the converted audio data. The audio output module 142 may output not only the data decoded by the codec 143, but also audio data stored in the memory 150 of the image display device 100, audio data received through the communication unit 120, audio data received through the user input unit 130, and the like.

The audio output module 142 may include at least one of a dynamic speaker, an electrostatic speaker and a planar-magnetic speaker.

The display module 141 may output information processed in the image display device 100. For example, when the image display device 100 is in an image output mode, the display module 141 may output an image. Also, when the image display device 100 is in an Internet communication mode, the display module 141 may output user interface (UI) or graphic user interface (GUI) associated with Internet communication. Also, the display module 141 may output a shape change guide (or shape modification guide).

The display module 141 may include at least one of a Liquid Crystal Display (LCD), a Thin Film Transistor-Liquid Crystal Display (TFT-LCD), an Organic Light-Emitting Diode (OLED), a flexible display, a three-dimensional (3D) display, plasma display panel (PDP) and multi display tube (MDT).

Meanwhile, the flexible display denotes a display device which can be curved, and is also referred to as a curved display, or flexible display.

The flexible display uses a plastic substrate other than a glass substrate. Therefore, a low-temperature fabrication processor is usually used, instead of the conventional fabrication processor, to prevent damage on the substrate. The flexible display may obtain flexibility to be folded or unfolded, by substituting a plastic film for a glass substrate, which covers liquid crystal in the LCD or OLED.

The flexible display has advantages in view of light weight, thin thickness, being strong against impacts, being curved or bent, and being fabricated in various shapes.

When the display module 141 is interlayered with a sensor for sensing a touch operation (hereinafter, referred to as 'touch sensor'), the display module 141 may be used as an input device as well as an output device. The touch sensor may have a form of a touch film, a touch sheet, a touch pad and the like.

The touch sensor may convert the change of pressure applied to a specific portion of the display module 141 or capacitance which is generated at the specific portion of the display module 141 into an electric input signal. The touch sensor may be configured to detect a touch position, a touch area and even touch pressure.

When a touch input is sensed by the touch sensor, a corresponding signal(s) is sent to a touch controller. The touch controller processes the signal(s) and transmits corresponding data to the controller 160. The controller 160 can thus be known of which region of the display module 141 has been touched.

The memory may store a program for operations of the controller 160, or temporarily store input/output data (for example, still images, videos, etc.). Also, the memory 150 may store shape change patterns.

The memory 150 may include at least one type of storage media including a flash memory, a hard disk, a multimedia card micro type, a card-type memory (e.g., SD or XD memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The image display device 100 may also be operated in relation to a network storage device that performs the storage function of the memory 150 over the Internet.

The controller 160 typically controls the general operations of the image display device 100. For instance, the controller 160 performs control and processing associated with image output, audio output, image mode conversion and the like. Also, the controller 160 may acquire shape information related to the flexible display module 141 based on a multi-view image signal which is acquired through the image-acquiring unit. The controller 160 may also acquire depth information between two image signals which are included in the multi-view image signal.

The controller may also acquire image information between two image signals using interpolation based on the acquired depth information.

Meanwhile, the controller 160 may acquire depth information from planar image signals of two viewpoints, which do not include depth information.

Also, the controller 160 may acquire curvature information which is included in the shape information relating to the flexible display module 141 based on the multi-view image signal.

The power supply unit 170 may receive external power or provide internal power and supply the appropriate power required for operating respective elements and components.

The shape-forming unit 180 may change the shape of the flexible display module 141 based on the shape information acquired by the controller 160.

The interface unit 190 serves as a path allowing the image display device 100 to interface with external devices. The interface unit 190 receives data from an external device, transfers supplied power to each component within the image display device 100, or transmits data within the image display device 100 to an external device. For example, the interface unit 190 may include any of wired or wireless headset ports, external power supply ports, wired or wireless data ports, memory card ports, ports for connecting a device having an identification module, audio input/output (I/O) ports, video I/O ports, earphone ports, and the like. The image display device 100 may be a non-portable terminal, for example, an Internet protocol television (IPTV) terminal, a television, a 3D television, an imaging device, a telematics terminal or a vehicle-mount navigation terminal. Also, the image display device 100 may be a portable terminal. The portable terminal may be one of a mobile communications terminal, a multimedia reproduction terminal and a tablet terminal. In more detail, the portable terminal may be one of a mobile terminal, a personal digital assistant (PDA), a smart phone, a portable multimedia player (PMP), a laptop computer and a tablet PC.

An image display device disclosed herein is configured such that an image according to an input image signal is displayed on a display module. If an input image signal is a multi-view image signal and the image display device is implemented as a flexible display, a shape of the display module may be changed according to camera position information included in the multi-view image signal and the image may be output to the display module. As one example, if a multi-view image signal is an image signal which is generated by capturing the same object at first to third viewpoints (or views), predetermined portions of the flexible display can be changed in shape such that a user can view the object at the different viewpoints. Images which are captured at the first to third viewpoints may be output on the respective changed portions of the flexible display.

Hereinafter, more detailed description will be given with reference to the drawings.

FIG. 4

Figure 4:
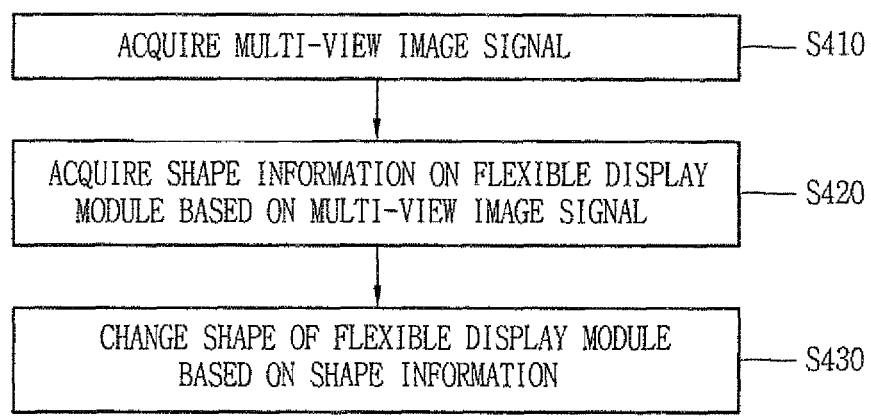
FIG. 4 is a flowchart illustrating an image displaying method in accordance with one exemplary embodiment disclosed herein.

FIG. 4 is a flowchart illustrating an image displaying method in accordance with one exemplary embodiment disclosed herein.

In accordance with one exemplary embodiment disclosed herein, the image-acquiring unit may acquire a multi-view image signal (S410). For example, the image-acquiring unit may acquire the multi-view image signal through the broadcast receiving unit 110, the communication unit 120, the user input unit 130 and the like.

The multi-view image signal may include stereoscopic image data. For instance, the multi-view image signal may be generated by capturing one object (target) using a plurality of stereoscopic image cameras. Also, the multi-view image signal may include images obtained by capturing one object at a plurality of positions, respectively.

The multi-view image signal may include camera position information. The camera position information may include positions, arrangement and the like associated with the plurality of cameras which have been used for capturing images to generate the multi-view image signal.

FIG. 5

Figure 5:
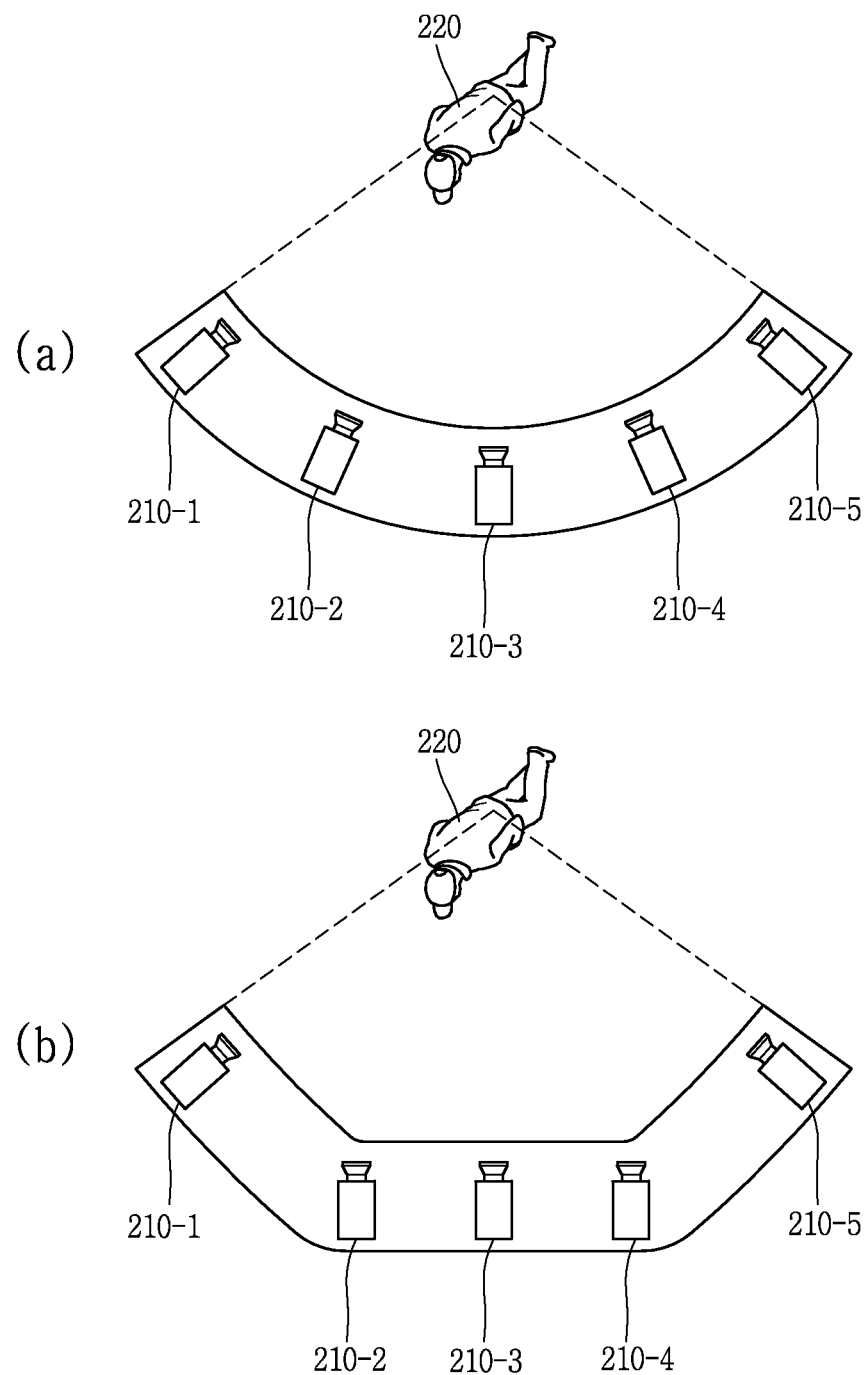
FIG. 5 is an exemplary view illustrating camera position information.

FIG. 5 is an exemplary view illustrating camera position information.

As illustrated in FIG. 5, a plurality of cameras 210-1, 210-2, 210-3, 210-4 and 210-5 may capture an object 220 to be captured (simple, object) to generate a multi-view image signal. Each of the cameras 210-1, 210-2, 210-3, 210-4 and 210-5 are differently oriented with respect to the object 220. Hence, each camera may capture a different image for the one object 220. For example, an image of the object 220 captured by the camera 210-1 and an image of the object 220 captured by the camera 210-5 are different from each other.

As illustrated in FIG. 5(*a*), five different image signals which are obtained by capturing the one object 220 may be generated. Therefore, a multi-view image signal including the five image signals may be generated. The multi-view image signal may include position information related to each of the cameras.

As illustrated in FIG. 5(*b*), similar to FIG. 5(*a*), five different image signals which are obtained by capturing the one object 220 may be generated. Then, a multi-view image signal including the five image signals may be generated.

However, the arrangement of the cameras illustrated in FIG. 5(*b*) is different from the arrangement of the cameras illustrated in FIG. 5(*a*).

Accordingly, the multi-view image signal generated in FIG. 5(*b*) is different from the multi-view image signal generated in FIG. 5(*a*). Also, the camera position information included in the multi-view image signal generated in FIG. 5(*b*) is different from the camera position information included in the multi-view image signal generated in FIG. 5(*a*).

FIG. 5 has exemplarily illustrated that the plurality of cameras are arranged on a plane. However, a plurality of cameras may also be arranged on a plane in a perpendicular direction, or arranged with different intervals from one another.

Meanwhile, according to the one exemplary embodiment disclosed herein, the controller 160 may acquire shape information related to the flexible display module based on the acquired multi-view image signal (S420).

The flexible display module can be folded, bent (or curved), stretched and the like, and have a changeable shape accordingly.

The shape information may include information related to a shape into which the flexible display module should be changed due to the folding, bending, stretching and the like.

FIG. 6

Figure 6:
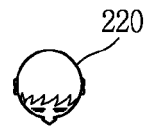
FIG. 6 is a view illustrating one embodiment of a method of obtaining shape information related to a flexible display module.
Figure 6:
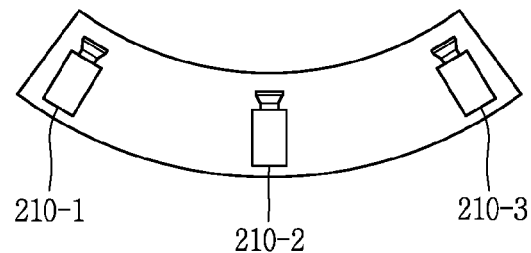
Figure 6:
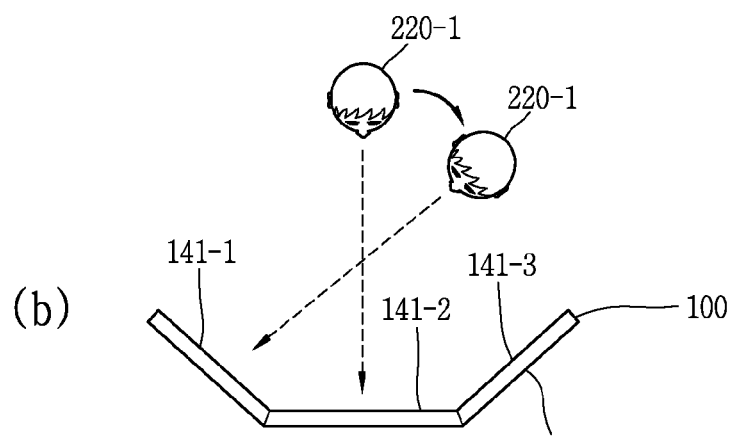
Figure 6:
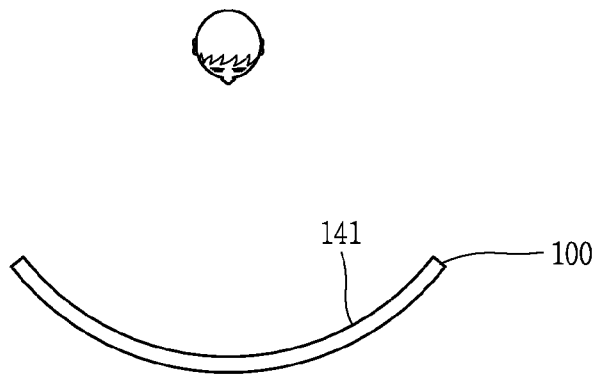

FIG. 6 is a view illustrating one embodiment of a method of obtaining shape information related to a flexible display module.

As illustrated in FIG. 6(*a*), a plurality of cameras 210-1, 210-2 and 210-3 may capture an object 220 to generate a multi-view image signal.

A shape of a flexible display module may be decided based on camera position information included in the multi-view image signal.

That is, as illustrated in FIG. 6(*a*), the multi-view image signal may include arranged position information relating to the plurality of cameras 210-1, 210-2 and 210-3. Therefore, the controller 160 may acquire shape information related to the flexible display module 141 based on the arrangement of the plurality of cameras 210-1, 210-2 and 210-3. For example, the controller 160 may acquire the shape information related to the flexible display module, which has a shape corresponding to the arrangement of the plurality of cameras 210-1, 210-2 and 210-3. Or, the controller 160 may select one of preset shape information based on the camera position information.

FIG. 6(*b*) illustrates one embodiment of a flexible display module which is formed based on the camera arrangement illustrated in FIG. 6(*a*).

Since the three cameras 210-1, 210-2 and 210-3 are capturing the object, the multi-view image signal may include images corresponding to three viewpoints (see FIG. 6(*a*)). In addition, when the multi-view image signal is displayed, the image display device may output the three images.

Referring to FIG. 6(*b*), it can be noticed that the flexible display module 141 is divided into three regions 141-1, 141-2 and 141-3 such that the image display device can display the three different images.

For example, an image captured by the first camera 210-1 may be output to the first region 141-1 of the flexible display module 141, and an image captured by the second camera 210-2 may be output to the second region 141-2 of the flexible display module 141. Also, an image captured by the third camera 210-3 may be output to the third region 141-3 of the flexible display module 141.

When a viewer (user or operator) who captures an image at the position of the second camera 210-2 moves to the position of the first camera 210-1 in a clockwise direction, the viewer who was viewing the image captured by the second camera 210-2 can view the image captured by the first camera 210-1. According to the shape of the flexible display module as illustrated in the embodiment, when the viewer who was viewing the image output on the second region 141-1 (i.e., the image captured by the second camera) moves along the clockwise direction, the viewer can view the image output on the first region 141-1 (i.e., the image captured by the first camera).

Or, the image captured by the first camera 210-1 may be displayed on the third region 141-3 of the flexible display module. The image captured by the second camera 210-2 may be displayed on the second region 141-2 of the flexible display module. The image captured by the third camera 210-3 may be displayed on the first region 141-1 of the flexible display module.

Meanwhile, the aforementioned embodiments have illustrated the method of acquiring the shape information related to the flexible display module based on the multi-view image signal using the three cameras. However, it may also be possible to acquire shape information related to a flexible display module based on a multi-view image signal using more cameras.

FIG. 6(c) illustrates another embodiment of a flexible display module which is formed based on the camera arrangement illustrated in FIG. 6(a).

Since the three cameras 210-1, 210-2 and 210-3 are capturing the object, the multi-view image signal may include images corresponding to three viewpoints (see FIG. 6(a)).

Meanwhile, the controller 160 may generate a plurality of image signals based on the images of the three viewpoints. For example, the controller 160 may acquire depth information between images of two viewpoints based on image information related to the two viewpoints. Also, the controller may acquire image information related to the two image signals using interpolation based on the acquired depth information. In such a manner, the controller 160 may acquire an image corresponding to a viewpoint, which has not been included in the multi-view image signal.

Here, the depth information refers to a relative depth among a plurality of objects included in an image. That is, if a first object is located close to a user and a second object is relatively located farther away from the user than the first object, the relative position information between the first and second objects is the depth information. Here, the images may be output on the flexible display module in a manner that the plurality of objects have depth perception using depth information related to each object acquired by the controller. That is, the shape of the flexible display module is changed in such manner that a shape of a predetermined portion of the display module on which the first object is to be output is changed to be closer to the user, and a shape of another portion on which the second object is to be output is changed to be far away from the user.

A level of the change of the shape of the flexible display module may depend on depth information. That is, if the second object has a second depth which is greater (higher) than a first depth of the first object, a predetermined portion of the display module on which the second object is output may be more changed in shape than another portion.

Meanwhile, if an image signal does not include depth information, the controller 160 may acquire the depth information from two image signals which have not included the depth information.

Hence referring to FIG. 6(c), the controller 160 may acquire shape information related to the flexible display module in a curved shape based on a multi-view image signal which includes a plurality of viewpoints. Here, the controller 160 may acquire curvature information related to the flexible display module. That is, the controller 160 may decide the curvature of the curved shape based on the multi-view image signal.

In such a manner, the controller 160 may acquire an image signal at a position which has not been captured by a camera. The user may view a stereoscopic image according to a corresponding position of various positions. Also, the user can feel a full, natural stereoscopic effect even if the user's eyes viewing the display module change in the viewing direction.

Figure 7:
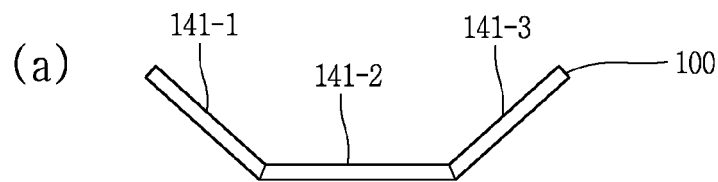
FIG. 7 is a view illustrating another embodiment of a method of obtaining shape information related to a flexible display module.
Figure 7:
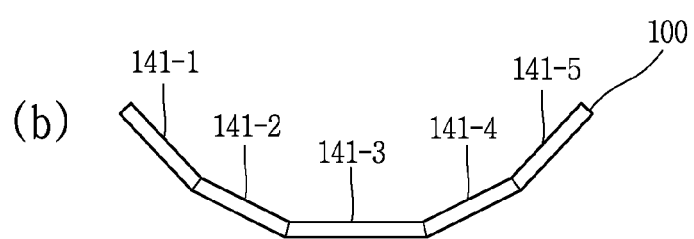
Figure 8:
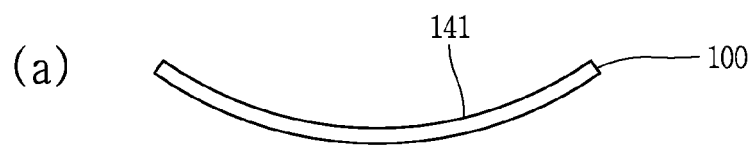
FIG. 8 is a view illustrating another embodiment of a method of obtaining shape information related to a flexible display module.
Figure 8:
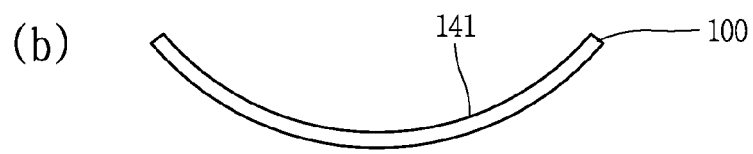

FIGS. 7 and 8

FIG. 7 is a view illustrating another embodiment of obtaining shape information related to a flexible display module.

The controller 160 may generate shape information relating to the flexible display module in various manners, based on a multi-view image signal.

For example, with regard to a predetermined multi-view image signal, the controller 160, as illustrated in FIG. 7(a), may generate shape information related to the flexible display module, which includes three regions 141-1, 141-2 and 141-3. Or, the controller 160, as illustrated in FIG. 7(b), may generate shape information related to the flexible display module, which includes five regions 141-1, 141-2, 141-3, 141-4 and 141-5.

In this manner, the controller 160 may appropriately generate the shape information relating to the flexible display module according to interpolation.

FIG. 8 is a view illustrating another embodiment of a method of obtaining shape information related to a flexible display module.

The controller 160 may generate shape information relating to the flexible display module in various manners, based on a multi-view image signal.

For example, with regard to a predetermined multi-view image signal, the controller 160, as illustrated in FIG. 8(a), may generate shape information related to the flexible display module having a curvature. Or, the controller 160, as illustrated in FIG. 8(b), may generate shape information related to the flexible display module having a curvature different from the curvature.

In this manner, the controller 160 may appropriately generate the shape information relating to the flexible display module according to interpolation.

Meanwhile, the controller 160 may acquire shape information in a manner of selecting one of shape change (or modification) patterns which are stored in the memory. Here, the controller 160 may select a shape change pattern which is appropriate for an acquired multi-view image signal. The shape change pattern may include information related to the change of the shape of the flexible display module. For example, each shape information illustrated in FIG. 7 may correspond to the shape change pattern. Also, the shape change patterns may be stored in the memory 150. As such, preset patterns associated with the change of the shape of the flexible display module can be stored in the memory 150, which may result in simplifying the configuration of the shape-forming unit 180.

Meanwhile, according to the one exemplary embodiment disclosed herein, the shape-forming unit 180 may change the shape of the flexible display module based on the shape information (S430).

FIG. 9

Figure 9:
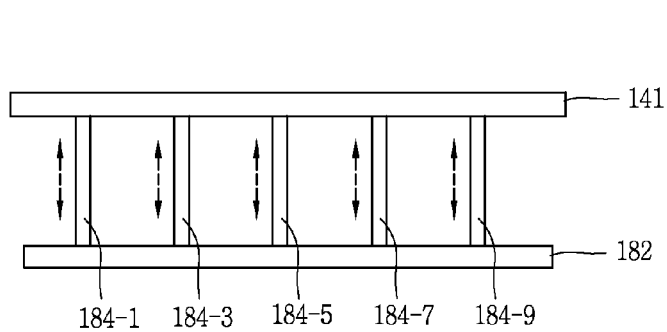
FIG. 9 is a view illustrating one embodiment of a method in which a shape-forming unit changes a shape of a flexible display module based on shape information.
Figure 9:
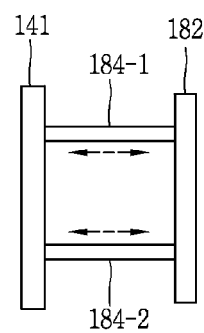
Figure 9:
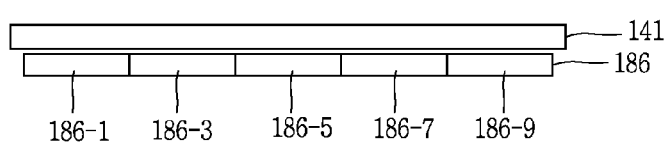
Figure 9:
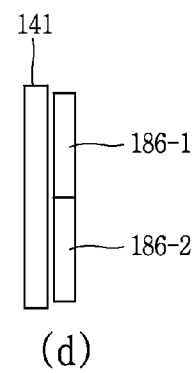

FIG. 9 is a view illustrating one embodiment of a method in which the shape-forming unit 180 changes the shape of the flexible display module based on the shape information.

FIGS. 9(*a*) and 9(*b*) illustrate one embodiment of a method of configuring a shape-forming unit by using an arm panel and arms. The arm panel 182 may include a structure for moving the arms to left and right and up and down. Also, the arms may be components for changing a shape of a partial region of the flexible display module. That is, the flexible display module 141 may be curved (or bent), folded or stretched, in response to an operation of each arm connected to the arm panel 182.

FIG. 9(*a*) is a top view of the shape-forming unit according to the aforementioned embodiment. As illustrated in FIG. 9(*a*), the flexible display module 141 may be connected to one end of each of the arms 184-1, 184-3, 184-5, 184-7 and 184-9. As some of those arms 184-1, 184-3, 184-5, 184-7 and 184-9 are moved in directions indicated with arrows, the flexible display module 141 may be folded in left and right directions. This embodiment illustrates that the flexible display module includes the five arms 184-1, 184-3, 184-5, 184-7 and 184-9 in left and right directions, but the number of arms may be appropriately adjustable if necessary.

FIG. 9(*b*) is a side view of the shape-forming unit according to the aforementioned embodiment. As illustrated in FIG. 9(*b*), the flexible display module 141 may be connected to one end of each of arms 184-1 and 184-2. As some of those arms 184-1 and 184-2 are moved in directions indicated with arrows, the flexible display module 141 may be folded in up and down directions. This embodiment illustrates that the shape-forming unit includes the two arms 184-1 and 184-2, but the number of arms may be appropriately adjustable if necessary.

FIGS. 9(*c*) and 9(*d*) are views illustrating one embodiment of a method of configuring a shape-forming unit using a shape memory alloy.

For example, a shape-forming unit 186 including a shape memory alloy may be changed in shape due to heat.

Meanwhile, a component (not illustrated) which heats the shape-forming unit 186 may further be provided.

The shape-forming unit 186 is a component for changing a shape of a partial region of the flexible display panel. The controller 160 may control the flexible display module 141 to be deformed into a shape corresponding to shape information, in a manner of applying an appropriate amount of heat to the shape-forming unit 186. For example, as the shape-forming unit 186 is deformed into a predetermined shape in response to heat applied thereto, a shape of the flexible display module 141 which is connected to the shape-forming unit 186 may also be transformed into a shape corresponding to the shape of the shape-forming unit 186.

FIG. 9(*c*) is a top view of the shape-forming unit according to the aforementioned embodiment. FIG. 9(*d*) is a side view of the shape-forming unit according to the aforementioned embodiment.

As illustrated in FIGS. 9(*c*) and 9(*d*), the shape-forming unit 186 may be divided into regions 186-1, 186-3, 186-5, 186-7 and 186-9. Therefore, the controller 160 may control heat to be applied to some of those divided regions.

In addition to those aforementioned embodiments, various other methods may be employed to form a shape-forming unit for changing a shape of a flexible display module.

In such a manner, as the flexible display module is changed into an appropriate shape by the shape-forming unit, the user can fully feel a stereoscopic effect of a stereoscopic image. Also, users who are located within every viewing angle area can fully feel the stereoscopic effect. In addition, the user can fully feel the stereoscopic effect in every direction viewing a screen.

FIG. 10

Figure 10:
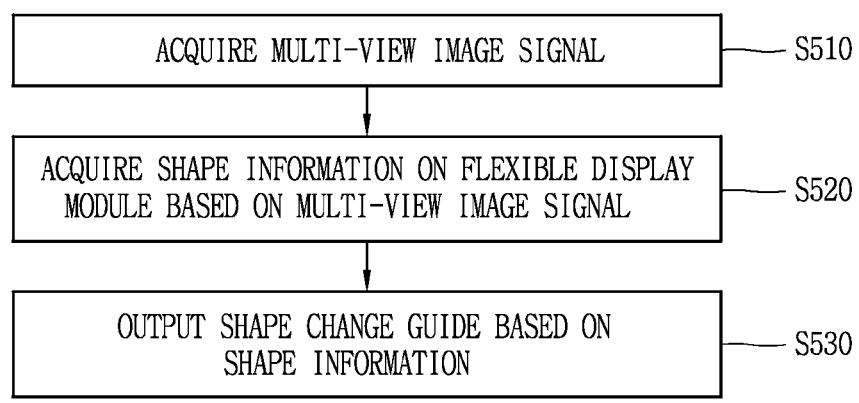
FIG. 10 is a flowchart illustrating an image displaying method in accordance with another exemplary embodiment disclosed herein.

FIG. 10 is a flowchart illustrating an image displaying method in accordance with another exemplary embodiment disclosed herein.

According to one exemplary embodiment disclosed herein, the image-acquiring unit 180 may acquire a multi-view image signal (S510).

Also, according to the one exemplary embodiment disclosed herein, the controller 160 may acquire shape information related to a flexible display module based on the acquired multi-view image signal (S520).

Also, according to the one exemplary embodiment disclosed herein, the display module 141 may output a shape change guide based on the shape information (S530).

As aforementioned, according to this one exemplary embodiment, the shape-forming unit 180 may change the shape of the flexible display module based on the shape information. However, to employ this method, the image display device may further include a component for the shape-forming unit.

Therefore, according to another exemplary embodiment disclosed herein, the flexible display module may output a shape change guide, other than the shape-forming unit changing the shape of the flexible display module. And, a user may change the shape of the flexible display module based on the shape change guide.

The shape change guide refers to information for guiding a preferable shape into which the flexible display module should be changed. The shape change guide may include a preferable shape change position, a preferable shape change angle and the like of the flexible display module.

FIG. 11

Figure 11:
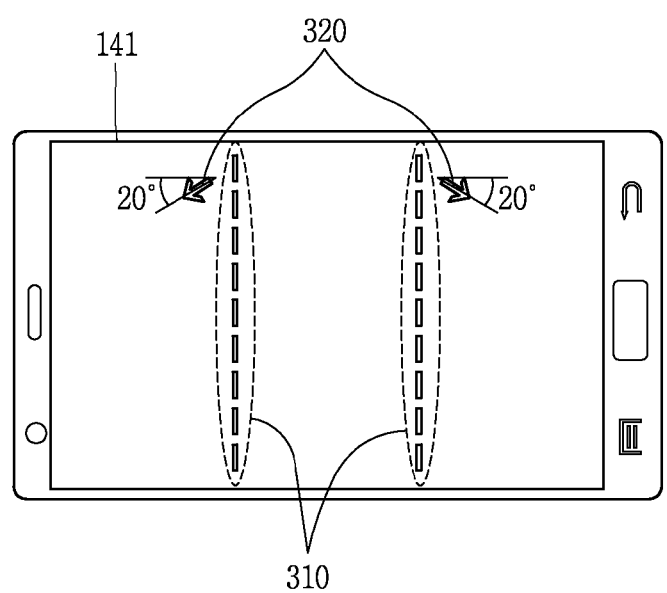
FIG. 11 is a view illustrating one embodiment of a method of displaying a shape change guide on a flexible display module.

FIG. 11 is a view illustrating one embodiment of a method of displaying a shape change guide on a flexible display module.

As illustrated in FIG. 11, the flexible display module 141 may output a shape change position 310 and a shape change angel 320. The shape change position 310 refers to a preferable position at which the flexible display module 141 should be folded. The shape change angle 320 refers to a preferable angle which should be formed between a folded region and the existing (non-folded) region when the flexible display module is folded.

In such a manner, instead of the shape-forming unit changing the shape of the flexible display module, the shape change guide may be displayed on the flexible display module. Accordingly, the present disclosure can provide a simple method of fully providing a stereoscopic effect.

Those image displaying methods according to the exemplary embodiments disclosed herein may be used independently or by combination thereof. Also, steps configuring each embodiment may be used independent of or by combination with steps configuring other embodiments.

The aforementioned methods may be implemented in a computer-readable or its similar medium using, for example, software, hardware, or any combination thereof.

For hardware implementation, the methods described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electronic units designed to perform the functions described herein.

For software implementation, the embodiments such as procedures or functions described herein may be implemented by separate software modules. The software modules can be implemented as software codes written in any suitable programming language. The software codes may be stored in a storage unit and executed by a processor.

Also, the foregoing description have been given in detail of the exemplary embodiments disclosed herein. However, the scope of the present disclosure may not be limited to those. Various modifications and improvements which are implemented by those skilled in the art using the basic idea of the present disclosure defined in the following claims can belong to the scope of the present disclosure.

INDUSTRIAL AVAILABILITY

The exemplary embodiments disclosed herein may be applied to various related industrial fields by proposing a method of changing a shape of a flexible display module according to user position information or image information to be displayed in an image display device.

The invention claimed is:

1. A method for controlling an image display device having a flexible display module, the method comprising:
   receiving a multi-view image signal for one object captured by a plurality of stereoscopic image cameras;
   acquiring alignment information regarding a position of the plurality of stereoscopic image cameras from the received multi-view image signal;
   generating curvature information related to a curved shape of the flexible display module corresponding to the alignment information regarding the position of the plurality of stereoscopic image cameras; and
   outputting a shape change guide including a shape change position and a shape change angle of the flexible display module to the flexible display module based on the generated curvature information,
   wherein the shape change position refers to a position at which the flexible display module should be folded and the shape change angle refers to an angle which should be formed between a folded region and a non-folded region when the flexible display module is folded.

2. The method of claim 1, wherein the multi-view image signal comprises stereoscopic image data.

3. The method of claim 1, wherein receiving the multi-view image signal comprises:
   calculating depth information between two image signals which are included in the multi-view image signal; and
   generating an image between the two image signals using interpolation based on the calculated depth information.

4. The method of claim 1, further comprising:
   changing, by a former shape of the image display device, a curvature of the curved shape of the flexible display module based on the output shape change guide,
   wherein changing the curvature comprises applying heat to a shape-former based on the output shape change guide.

5. The method of claim 4, wherein changing the curvature comprises operating the shape-former based on the output shape change guide.

6. An image display device comprising:
   a flexible display module;
   a receiver configured to receive a multi-view image signal for one object captured by a plurality of stereoscopic image cameras; a controller configured to:
   acquire alignment information regarding a position of the plurality of stereoscopic image cameras from the received multi-view image signal,
   generate curvature information related to a curved shape of the flexible display module corresponding to the alignment information regarding the position of the plurality of stereoscopic image cameras, and
   output a shape change guide including a shape change position and a shape change angle of the flexible display module to the flexible display module based on the generated curvature information,
   wherein the shape change position refers to a position at which the flexible display module should be folded and the shape change angle refers to an angle which should be formed between a folded region and a non-folded region when the flexible display module is folded.

7. The image display device of claim 6, further comprising:
   a shape-former configured to change a curvature of the curved shape of the flexible display module based on the output shape change guide.

* * * * *